Aug. 17, 1926.

J. WALDHEIM 1,596,035

TYPEWRITING MACHINE

Filed August 25, 1922

Inventor:
John Waldheim
by B. C. Stickney
Attorney

Patented Aug. 17, 1926.

1,596,035

UNITED STATES PATENT OFFICE.

JOHN WALDHEIM, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING MACHINE.

Application filed August 25, 1922. Serial No. 584,188.

The present invention relates to casings for portable typewriting machines.

Heretofore, the casing in which a portable typewriting machine has been carried has been constructed in two parts; to wit, a base-piece to which the machine is attachable, and which may serve as a base-board in the operation of the machine, and a cover which may be set down over the base-piece and over the machine attached thereto. Suitable means for securing the base-piece to the cover, and a handle on the cover have been provided. As such casings have heretofore commonly been constructed and held together, with the machine enclosed therein, the weight of the machine, in the transportation thereof, has fallen upon the walls of the casing in such manner as to tend to strain and distort the same.

An object of the present invention is the provision of novel and simple means in the casing for relieving the walls thereof, which may be composed of non-metallic material, of injurious strains when the machine is carried by the handle on the cover of the casing. More particularly, an object of the invention is the provision and incorporation within the casing, and as part of the cover, of a bracket or retaining member connected to or suspended from the handle, or from the wall of the cover to which the handle is attached, to present a support on which the machine or the base-piece with attached machine may be set and supported, thus relieving the other walls of the cover of the weight of the machine.

A feature of the invention, in the preferred embodiment thereof, is the adaptability and use of this machine-supporting member as a reinforcement for the walls of the cover, which are usually jointed at their edges; and, to this end, in the preferred embodiment of the invention, the retaining member is in the form of a metal band or strip extending around the inside of the cover from the handle, and having the side and end walls of the cover secured thereto, and, therefore, reinforced thereby. Preferably, the retaining member is set at the edge of the cover in the form of an open frame within which the base-piece of the casing is set.

A feature of the invention, in the preferred form thereof, is the provision on the retaining member or band, at the edge of the casing, of fingers or guards for holding the base-piece and attached machine within the body of the casing after the parts have been assembled. Preferably, the band or retaining member is a flat, sheet-metal strip, having opposed reaches which are turned toward each other, and extend only partially along the end of the casing opposite the handle, and the end of each of which reaches terminates in a finger, which, when the end of the reach is folded upon itself, projects outward beyond the edge of the casing-body, so that, when turned upward, it forms a guard behind which the casing-base-piece may be inserted and held.

Other features and advantages will hereinafter appear.

In the accompanying drawings.

Figure 1:
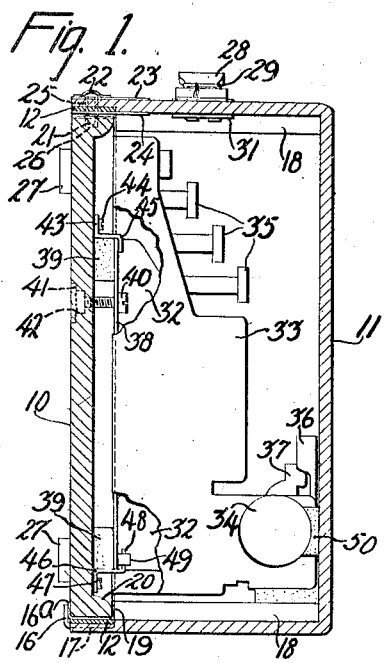
Figure 1 is a view in vertical cross-section through the assembled casing; the machine being shown enclosed therein.
Figure 2:
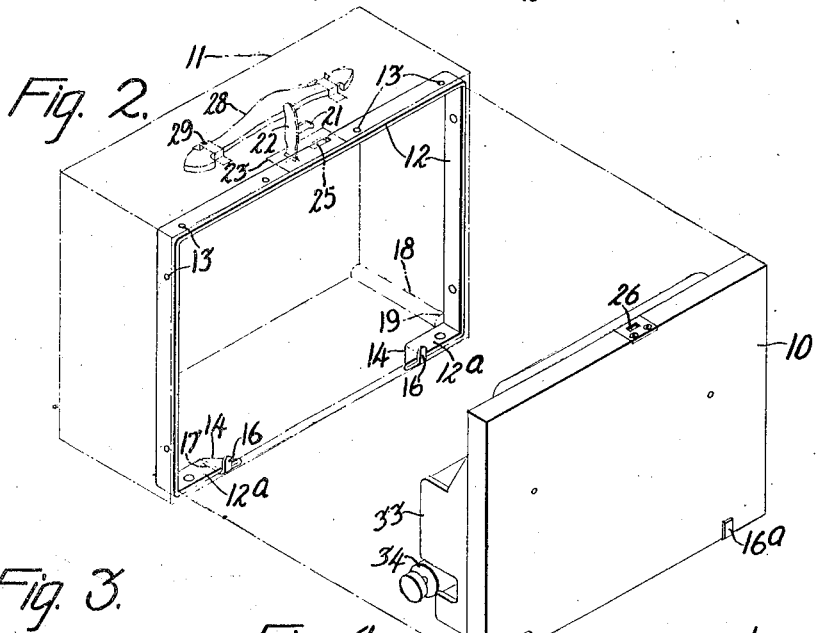
Figure 2 is a perspective view of the casing; the wall thereof which serves as the base-piece for the machine being shown as spread out from the cover and as having the machine attached thereto.
Figure 3:
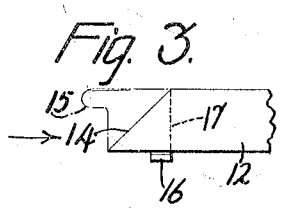
Figure 3 shows the formation of one of the ends of the bracket or band which supports the machine from the top of the casing.
Figure 4:
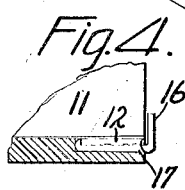
Figure 4 is a detail view looking in the direction of the arrow in Figure 3, the wall of the casing being shown in cross-section to show the manner in which the band or bracket is set into the same.

Referring to the drawings, the casing is shown as comprising a base-piece 10 and body-portion or cover 11. The walls of the cover-part 11 have a countersink extending peripherally around the interior thereof at their edges to receive an open frame or bracket 12 consisting of a metal band, which is secured to the cover by rivets 13 set at intervals therealong; or it may be said that the walls of the cover are secured to the band or bracket, which latter serves as a reinforcement for the cover. As shown in Figures 2, 3 and 4, the extremities of the band or bracket 12 are folded and turned under on oblique lines 14, so that fingers 15 on the extreme ends of the bracket or band, as shown in dot-and-dash lines in Figure 3, may be struck up, as shown at 16, forward of the plane of the edges of the body-part 11 of the casing. The band or bracket 12 is preferably of sheet-metal, in the stamping of which the fingers 15 are formed thereon. To receive the underturned or folded part 17, see Figure 4, of the band or bracket, the inner face of the casing is correspondingly countersunk or recessed. The fingers 15 serve as guards to hold the base-piece 10 when the latter is in place. To cover the base-piece with the machine thereon, the cover in tilted position is placed over the machine and is drawn forward against the rear edge of the base-piece, the fingers or guards 16 engaging under the base-piece; and thereupon the cover is swung down over the base-piece 10. The base-piece, which may be composed of wood or other light material, may have metal pieces 16ª set in the face thereof where the same is engaged by the guards 15 to prevent wear at these points. In each corner of the cover is an elongated block 18 which may assist in holding the walls of the cover together. The lower ends 19 of these blocks 18 engage a peripheral flange 20 formed on the base-piece and co-operate with the fingers 16 in holding the cover on the base-piece 10 at the rear. At its forward end, the cover is held to the base-piece by a bolt 21 on a finger-piece 22 hinged to a plate 23 on the outer face of the cover. The plate 23 is riveted through the cover to a plate 24 on the inner face thereof. The plate 24, as shown in Figure 1, serves as a further means for securing the band or bracket 12 to the cover portion at the forward or, as shown in Figure 1, upper wall thereof. The bolt 21 passes through an aperture 25 in the cover and into a recess 26 in the base-piece, in which position it may be locked by a key, not shown.

The base-piece is provided with front and rear rubber feet 27, to support the base-piece with the machine thereon when the latter is in use. The cover is provided with a handle or strap 28 held by bands 29, which are riveted through the cover to a plate 31 on the inside of the latter. The wall to which the handle 28 is attached may be composed of metal or other strong or rigid material, so that the handle may be firmly connected to the frame 12.

The machine comprises an inner frame 32 and an outer or ornamental frame 33 secured to the inner frame by screws. The machine has a rotary platen 34 mounted in any suitable manner for movement in letter-feed and return directions and for shift between case-positions on the main frame. Type-keys are indicated at 35; a line-space lever at 36; and a carriage-return finger-piece at 37.

An inwardly-turned lip or flange 38 is formed on each side of the frame 32. The machine is supported by these flanges on four blocks 39, to wit, two at the front and two at the rear, of compressed or hardened felt. For securing the machine to the base-piece, screws 40 pass through the flanges 38 and thread into nuts 41 set into the bottom of the base-piece. The nuts 41 are squared so as to be held against rotation when the screws 40 are tightened, and are shouldered at 42 to hold the same against movement into the base-piece by the pull of the screws when the latter are tightened. Guards 43 secured by screws 44 to the top of the base-piece have offsets 45, which, when the guards are in place, overlap the front ends of the flanges 38 to assist in holding them fixedly to the base-piece. Guards 46 are secured by screws 47 to the base-piece at the rear thereof and have offsets 48 adapted to be set into holes in lugs 49 formed on the frame 32 near the rear of the latter; and, when these guards are in place, they assist the screws 40 and the guards 43 in holding the machine against movement on the base-piece.

The shiftable parts of the machine are held against movement in the casing by blocks of felt. A felt block 50, positioned centrally of the casing cover near the rear of the latter, serves as an abutment for the top of the platen, and thus holds the shift-frame, and the parts carried thereby, in place when the machine is in the casing. The felt blocks 39 and 50 are glued or otherwise suitably secured to the casing members.

When the base-piece 10 with the machine attached thereto is within the cover, the case is turned front end up, as shown in Figure 1, to be carried by the handle 28. The weight of the assembled base-piece and machine rests upon the inturned ends 12ª of the bracket or band 12 at the rear wall of the cover. These inturned ends are therefore, in effect, platforms or supports upon which the base-piece is supported. This wall of the cover is the bottom wall of the casing when the latter is carried by its handle 28. It will be noted that the base-piece is supported entirely by the band or bracket 12, and that, therefore, the weight of the machine does not fall directly upon the walls of the casing cover. The bracket or band 12, being of metal or other strong, rigid material, protects the casing cover from strains and distortion, and liability of opening at the usual joints, to which it might otherwise be subjected.

Variations may be resorted to within the scope of the invention, and portions of the improvements may be used without others.

Having thus described my invention, I claim:

1. In combination, a carrying case for a portable typewriting machine including a base to which the machine is attached, a hollow cover having side walls and a top wall, a handle on one of the side walls, and a machine-supporting open frame on the interior of the cover and secured to the wall having the handle, said frame embracing the base to support it with the attached machine and relieving all of the remaining walls from stress caused by the weight of the machine.

2. In combination, a carrying case for a portable typewriting machine including a base to which the machine is attached, a hollow cover having side walls and a top wall, a handle on one of the side walls by which the case may be carried with its end up, the machine-supporting base being also disposed end up within the cover while in transit, a machine-supporting frame on the interior of said cover and secured to the wall having the handle, and supports on said frame adjacent the wall opposite the one having the handle, said supports to engage one edge of the base to support it and the attached machine to keep the weight of the machine from the wall adjacent the supports.

3. In combination, a carrying case for a portable typewriting machine including a base to which the machine is attached, a hollow cover having side walls and a top wall, a handle on one of said side walls, and a machine-supporting open frame on the interior of the cover and secured to the wall having the handle, said frame having inturned ends to form supports upon which the base with the attached machine may rest to relieve all of the remaining walls from stress caused by the weight of the machine.

4. In combination, a carrying case for a portable typewriting machine including a base to which the machine is attached, a hollow cover having side walls and a top wall, a handle on one of the side walls, a machine-supporting open frame on the interior of the cover and secured to the wall having the handle, said frame embracing the base to support it with the attached machine to relieve all of the remaining walls from stress caused by the weight of the machine, and fingers formed on said frame to engage the base to keep said base within the cover while the machine is in transit.

5. In combination, a carrying case for a portable typewriting machine including a base to which the machine is attached, a hollow cover having side walls and a top wall, a handle on one of the side walls, a machine-supporting open frame on the interior of the cover and secured to the wall having the handle, said frame embracing the base to support it with the attached machine to relieve all of the remaining walls from stress caused by the weight of the machine, fingers on said frame to engage the base, devices inside the cover to engage the inner edge of the base, said devices and said fingers cooperating to hold the cover on the base at one end, and means at the other end of the cover to assist in holding the cover on the base while the machine is in transit.

6. In combination, a carrying case for a portable typewriting machine including a base to which the machine is attached, a hollow cover having side walls and a top wall, a handle on one of the side walls, a machine-supporting open frame on the interior of the cover and secured to the wall having the handle, said frame embracing the base to support it with the attached machine to relieve all of the remaining walls from stress caused by the weight of the machine, and fingers on said frame to engage the base to keep said base within the cover while in transit, the ends of the frame being folded on oblique lines to form said fingers, said fingers projecting outwardly beyond the edge of the frame and being bent up to engage behind the bottom of said base.

JOHN WALDHEIM.